(12) United States Patent
Du

(10) Patent No.: US 9,008,613 B2
(45) Date of Patent: Apr. 14, 2015

(54) CONNECTION AND DATA APPLICATION BILLING

(75) Inventor: Xiaohui Du, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2815 days.

(21) Appl. No.: 11/176,166

(22) Filed: Jul. 6, 2005

(65) Prior Publication Data

US 2007/0010231 A1    Jan. 11, 2007

(51) Int. Cl.
*H04M 11/00* (2006.01)
*H04M 15/00* (2006.01)
*H04W 4/24* (2009.01)

(52) U.S. Cl.
CPC .......... *H04M 15/00* (2013.01); *H04M 15/8214* (2013.01); *H04M 15/8228* (2013.01); *H04W 4/24* (2013.01); *H04M 2215/2013* (2013.01); *H04M 2215/2026* (2013.01); *H04M 2215/22* (2013.01); *H04M 2215/32* (2013.01); *H04M 2215/782* (2013.01); *H04M 2215/7833* (2013.01)

(58) Field of Classification Search
USPC ............. 455/406, 554, 405, 557, 6; 454/405, 454/406, 554; 370/230, 235, 252, 256, 370/395.42, 474
See application file for complete search history.

(56) References Cited

U.S. PATENT DOCUMENTS

| | | | |
|---|---|---|---|
| 6,542,734 B1 | 4/2003 | Abrol et al. | |
| 6,625,645 B1 * | 9/2003 | Van Horne et al. | 709/221 |
| 6,751,475 B1 * | 6/2004 | Holmes et al. | 455/557 |
| 6,765,909 B1 * | 7/2004 | Sen et al. | 370/392 |
| 2003/0061160 A1 | 3/2003 | Asahina | |
| 2003/0065784 A1 * | 4/2003 | Herrod | 709/227 |
| 2003/0232615 A1 | 12/2003 | Kim et al. | |
| 2004/0076143 A1 * | 4/2004 | Lee | 370/352 |
| 2006/0030291 A1 * | 2/2006 | Dawson et al. | 455/405 |

FOREIGN PATENT DOCUMENTS

| | | |
|---|---|---|
| CN | 1492645 | 4/2004 |
| EP | 1 049 298 A2 | 11/2000 |
| EP | 1049288 A2 | 11/2000 |
| EP | 1 414 185 A2 | 4/2004 |
| JP | 2002252627 A | 9/2002 |

(Continued)

OTHER PUBLICATIONS

International Search Report and Written Opinion—PCT/US2006/026641, International Searching Authority—European Patent Office, Feb. 15, 2007.

*Primary Examiner* — Nimesh Patel
(74) *Attorney, Agent, or Firm* — Fariba Yadegar-Bandari

(57) ABSTRACT

A server and related method embodiments for determining usage on a wireless network are described. The server includes a connection detector, a connection classifier connected with the connection detector, and a usage tracker connected with the connection classifier. The connection detector detects a connection from a mobile station. The connection classifier determines the type of the detected connection. The usage tracker determines usage for each detected connection based on the connection type. A connecting mobile station for accessing the server includes a session controller for controlling a session with the server, a connection controller for controlling a connection related to the session, and an application assigner for controlling assignment of an application executed by the client to a particular connection.

31 Claims, 7 Drawing Sheets

(56) References Cited

FOREIGN PATENT DOCUMENTS

| | | |
|---|---|---|
| JP | 2003101678 A | 4/2003 |
| JP | 2004147284 A | 5/2004 |
| JP | 2005509322 | 4/2005 |
| KR | 20040049531 A | 6/2004 |
| KR | 20050006572 | 1/2005 |
| TW | 200412114 | 7/2004 |
| WO | 02084947 A2 | 10/2002 |
| WO | WO 03/100578 A2 | 12/2003 |
| WO | 2004051400 A2 | 6/2004 |

\* cited by examiner

CONNECTION AND DATA APPLICATION BILLING

BACKGROUND OF THE INVENTION

1. Field

The disclosed embodiments relate to billing functionality for wireless networks.

2. Background

The deployment of wireless internet protocol (IP)-based (also referred to as packet-based) networks provides wireless service providers maintaining wireless service networks with the capability of offering various IP-based data applications and services to end users. However, to generate the greatest financial return while allowing varied data delivery mechanisms and pricing plans, the problem of how end users should be billed has been inherently challenging for all service providers. The problem is challenging largely because charging for IP-based services involves numerous considerations: session length, packet speed, transaction type, service level, resource usage, and others. Currently, service providers employ mixed billing solutions, such as traditional billing on a monthly rate plan or IP billing based on time, e.g., minutes of use (MOU), and based on amount, e.g., packet octet counts. IP-based billing has several advantages over traditional billing methods: service providers gain flexibility on billing solutions and end users enjoy the ability to choose their desired service quality and pay on a need basis.

With the deployment of Third Generation (3G) high-speed wireless packet data networks, service providers can expand their data application realm by offering consumers more IP-based applications and services with rich content. Along with new IP-based services, e.g., streaming video, online gaming, stock trading, and many other services, service providers need new billing strategies.

In order to offer greater billing flexibility to service providers already having deployed high-speed wireless IP-based data networks, the underlying IP packet services over the wireless IP-based network must be separated into appropriate billing categories. However, current wireless IP-based networks deployed with either 3G 1x or 1xEV-DO networks do not provide such capabilities, or the accounting capabilities provided cannot fulfill service providers' special requirements. For example, a wireless service provider may desire to separate data services into different categories and bill customers based on other factors rather than on more traditional billing parameters, e.g., minutes of use (MOU) or data volume. To address these needs, billing solutions need to facilitate the separation of the different IP packet applications or services into different billing categories.

FIG. 1 depicts a high level block diagram of a wireless IP-based network architecture 100 including a mobile station 102 connected with a wireless service network 104 via a wireless connection 106. Wireless service network 104 may be provided by a wireless service provider. Wireless service network 104, in turn, is connected with an IP-based network 108 via network connection 110.

Mobile station 102 includes portable wireless computing devices, e.g., portable wireless telephones, personal digital assistants (PDAs) and paging devices, which are small, lightweight, and easily carried by users. More specifically, the portable wireless telephones, for example, further include cellular telephones that communicate voice and data packets over wireless networks, e.g., wireless service network 104.

Wireless service network 104 includes wireless service operators providing wireless connectivity between mobile station 102 and other mobile stations (not shown) connected with wireless service network 104 and/or IP network 108.

Wireless connection 106 is a wireless communication connection between mobile station 102 and wireless service network 104. Examples of wireless connection 106 vary based on the wireless service network 104 and include numerous protocols including code division multiple access (CDMA), 1xEV-Data Optimized (1xEV-DO), 1xEV-Data Voice (1xEV-DV), Universal Mobile Telecommunication System (UMTS), Wideband CDMA (WCDMA), Global System for Mobile Communications (GSM), General Packet Radio Service (GPRS), and other protocols.

IP network 108 includes IP-based communication networks, e.g., the Internet and other packet-based communication networks. Additional wired and wireless service networks (not shown) similar to wireless service network 104 may be connected with IP network 108.

Mobile station-related IP-based billing solution options have been proposed in the past; however, none of these approaches has been satisfactory. Two such options are now briefly discussed: (1) limiting each IP-based data packet session by a mobile station to a single application and (2) mobile station forwarding of billing information to the wireless service network.

In accordance with option one above, wireless service network 104 integrates all billing information for an IP-based data packet session between mobile station 102 and the wireless service network, specifically referred to as a point-to-point (PPP) session and referred to hereinafter as a session. Service provider 104 forms a usage data record (UDR) based on the end user session information collected. Under this approach, mobile stations are configured to limit each session to a single data application enabling service provider 104 to accurately record end user session information on a per application and service basis and provide the necessary granularity to enable service provider IP-based billing functionality. That is, by limiting each session between mobile station 102 and IP network 108 or service provider 104 to a single application or service, the service provider is able to differentiate between application and service types accessed by the end user and bill accordingly.

Unfortunately, this approach causes frequent session switching on and off whenever a user access different applications and/or services. Because setting up a session requires 3 to 4 seconds on average; session switching affects always-on services significantly and degrades the end user experience. Additionally, this option is not transmission-efficient requiring multiple setup and tear down communication sequences. Further, multiple billing records may be generated for a discontinuous application making use of or requiring multiple sessions thereby increasing the amount of effort required in implementing billing functionality.

In accordance with option two above, mobile station 102 identifies a single packet data application within a session, collects billing information associated with each application, and forwards the collected billing information to wireless service network 104 in the form of billing records. That is, mobile station 102 is only allowed to utilize a single application at a given time via wireless connection 106. In contrast to the first approach, mobile station 102 in the second approach collects and forwards billing information instead of service provider 104 collecting billing information.

In accordance with this approach, existing mobile stations must be modified to enable the collection and forwarding of the billing information and wireless service network systems must be modified to process the billing information from mobile stations. However, because a component of the billing system resides beyond the service providers' control, capable end users may be able to compromise billing data resulting in a security issue and consequent loss of revenue.

SUMMARY

The disclosed embodiments relate to billing functionality for wireless networks. In particular, server and related method embodiments for determining usage on a wireless network are described.

A server embodiment determines usage on a wireless network. The server includes a connection detector, a classifier, and a usage tracker. The connection detector detects a connection from a mobile station and the classifier is connected with the connection detector and determines the type of the detected connection. The usage tracker is connected with the connection classifier and determines usage for each detected connection based on the connection type.

A method embodiment determines usage on a wireless network and includes determining a connection type responsive to detection of establishment of a connection with a mobile station and capturing usage information for each established connection by connection type.

Another method embodiment determines usage on a wireless network and includes determining an application type change based on detection of a destination address in a packet differing from a previous destination address in a previous packet and capturing usage information for the application type determined by analyzing the detected different destination address.

A memory or a computer-readable medium embodiment stores instructions which, when executed by a processor, cause the processor to determine a connection type responsive to detection of a connection with a mobile station and capture usage information for each established connection by connection type.

A memory or a computer-readable medium embodiment stores instructions which, when executed by a processor, cause the processor to determine an application type change based on detection of a destination address in a packet differing from a previous destination address in a previous packet and capture usage information for the application type determined by analyzing the detected different destination address.

A server embodiment for determining usage on a wireless network includes a communication device, a processor coupled with the communication device, and a memory coupled with the processor. The memory stores instructions which, when executed by the processor, cause the processor to determine a connection type responsive to detection of a connection with a mobile station and capture usage information for each established connection by connection type.

A server embodiment for determining usage on a wireless network includes a communication device, a processor coupled with the communication device, and a memory coupled with the processor. The memory stores instructions which, when executed by the processor, cause the processor to determine an application type change based on detection of a destination address in a packet differing from a previous destination address in a previous packet and capture usage information for the application type determined by analyzing the detected different destination address.

A server embodiment for determining usage on a wireless network includes a connection detecting means, a classifying means, and a usage tracking means. The connection detecting means detects a connection from a mobile station. The classifying means determines the type of the detected connection. The usage tracking means determines usage for each detected connection based on the connection type.

Still other advantages of the embodiments will become readily apparent to those skilled in the art from the following detailed description, wherein the preferred embodiments are shown and described, simply by way of illustration of the best mode contemplated of carrying out the invention. As will be realized, other and different embodiments are realizable, and the several details presented herein are capable of modifications in various respects, all without departing from the present scope of embodiments.

DESCRIPTION OF THE DRAWINGS

The present embodiments are illustrated by way of example, and not by limitation, in the figures of the accompanying drawings, wherein elements having the same reference numeral designations represent like elements throughout and wherein.

DETAILED DESCRIPTION

Figure 1:
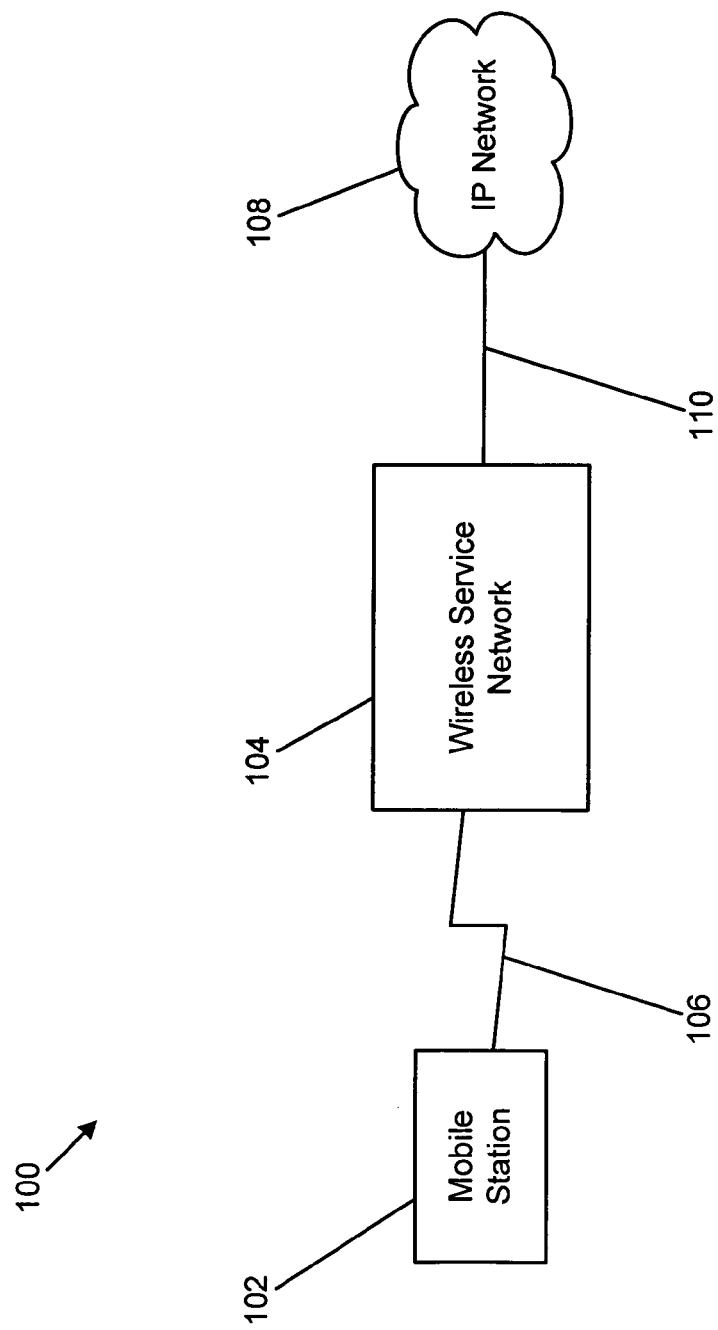
FIG. 1 is a high level block diagram of a wireless network architecture.
Figure 2:
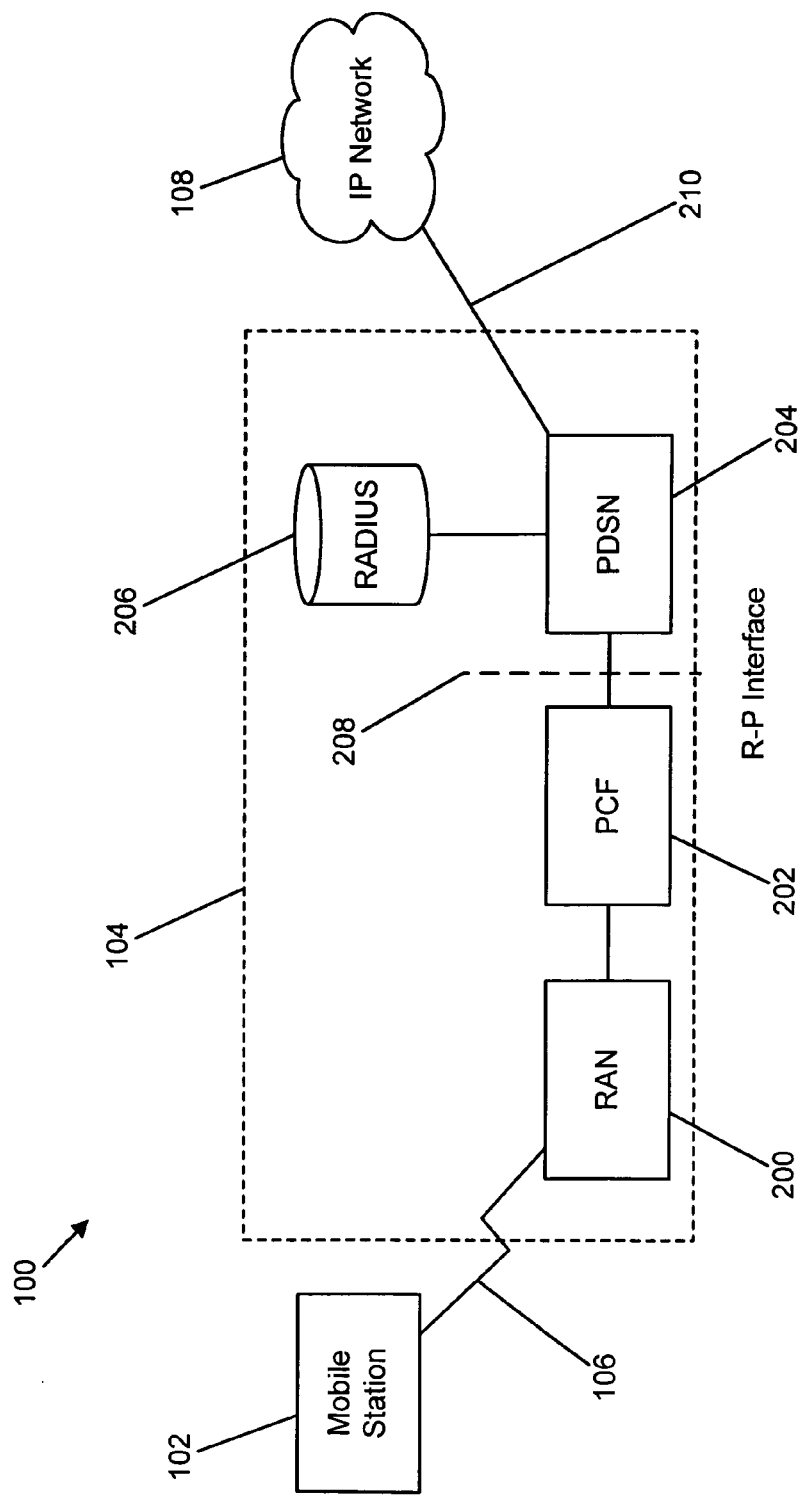
FIG. 2 is a detailed view of a portion of the wireless network architecture of FIG. 1.

FIG. 2 depicts a more detailed view of wireless IP-based network architecture 100, specifically, additional detail regarding components within wireless service network 104 is provided. Mobile station 102 connects with wireless service network 104 via wireless connection 106 to a radio access network (RAN) 200 of the service provider. RAN 200 refers to a base transceiver station (BTS) or tower responsible for communicating signals between mobile station 102 and wireless service network 104. In turn, RAN 200 connects to a packet control function (PCF) 202 executed by a processing system (not shown) which may or may not be co-located with one or more components of RAN 200. PCF 202 establishes the interface between RAN 200 and PDSN 204 which is termed the R-P connection. A packet data serving node (PDSN) 204 interfaces between IP network 108 and, ultimately, mobile station 102. That is, mobile station 102 data packet communications traverse RAN 200, PCF 202, and PDSN 204 in order to reach IP network 108. PDSN 204, as described in detail below, captures usage information regarding mobile station 102 communication with IP network 108. Further, wireless service network 104 includes a remote authentication dial-in user service (RADIUS) server 206 for authenticating mobile station 102 users connecting to the wireless service network and for generating user billing information based on received usage information from PDSN 204. RADIUS 206 is connected with PDSN 204 as depicted in FIG. 2.

In another embodiment, one or more of RAN 200, PCF 202, PDSN 204, and RADIUS server 206 functionality may be combined and execute on one or more processing systems, e.g., a computer system or other processing device. Further, in additional embodiments, there may be more than one instance of RAN 200, PCF 202, PDSN 204, and RADIUS server 206. For clarity, only a single instance of each is described hereinafter.

Mobile station 102 executes IP-based data applications using the architecture 100 described above in order to access applications and/or services at IP network 108 via service provider 104. In order to access IP network 108, a packet data session is established between mobile station 102 and PDSN 204. The packet data session describes the continuous use of a packet data service by a mobile station 102 user. Correspondingly, a point-to-point protocol (PPP) session describes the duration of a connection between mobile station 102 and PDSN 204. That is, mobile station 102 connects with RAN 200 via wireless connection 106, the connection continues through PCF 262 and then across a radio network-packet network (R-P) interface 208 to PDSN 204. R-P interface 208 is the interface between the PCF 202 and PDSN 204 across which an R-P connection is established in order to transport user packet data and signaling messages. The R-P connection is associated with a PPP session and is the communication connection across the R-P interface between PCF 202 and PDSN 204.

In an embodiment involving a wireless IP network, the IP-based packet accounting functionality involves RAN 200, PDSN 204, and RADIUS server 206. The packet accounting procedures include the following two steps:

First, RAN 200 generates an airlink record which is sent to PDSN 204 using R-P interface 208 messages transmitted across an R-P connection; and Second, PDSN 204 accessed by mobile station 102 merges radio-specific parameters contained in the airlink record received from RAN 200 with IP network-specific parameters to form one or more Usage Data Records (UDRs).

The airlink record is a collection of radio-specific parameters collected by RAN 200. Airlink record information varies depending on the type of airlink record and includes fields such as mobile station identifier (MSID), electronic serial number (ESN), serving PCF, and R-P connection identifier (ID), and others. IP network-specific parameters are the parameters collected by PDSN 204, e.g., to facilitate billing, and include, for example, PDSN address, remote IP address, octect count, active time, etc. Radio-specific parameters are included in airlink records and merged based on a specified format, e.g., 3GPP2 X.S0011-005-C "cdma2000 Wireless IP Network Standard: Accounting Services and 3GPP2 RADIUS VSAs."

After completing the second step, PDSN 204 transmits usage messages, e.g., RADIUS accounting messages, including usage information, e.g., UDR information, to RADIUS server 206. Usage information includes information, e.g., a mobile identifier, a user identifier, a session identifier, an infrastructure identifier, a zone identifier, a session status, a session activity, a quality of service, airlink record specific parameters, and a container, used in order to bill for wireless services provided to a user. Examples of usage information include the number of octets transmitted, start and stop timestamps, minutes of use, addresses accessed, application types, and other billing-related information.

Figure 3:
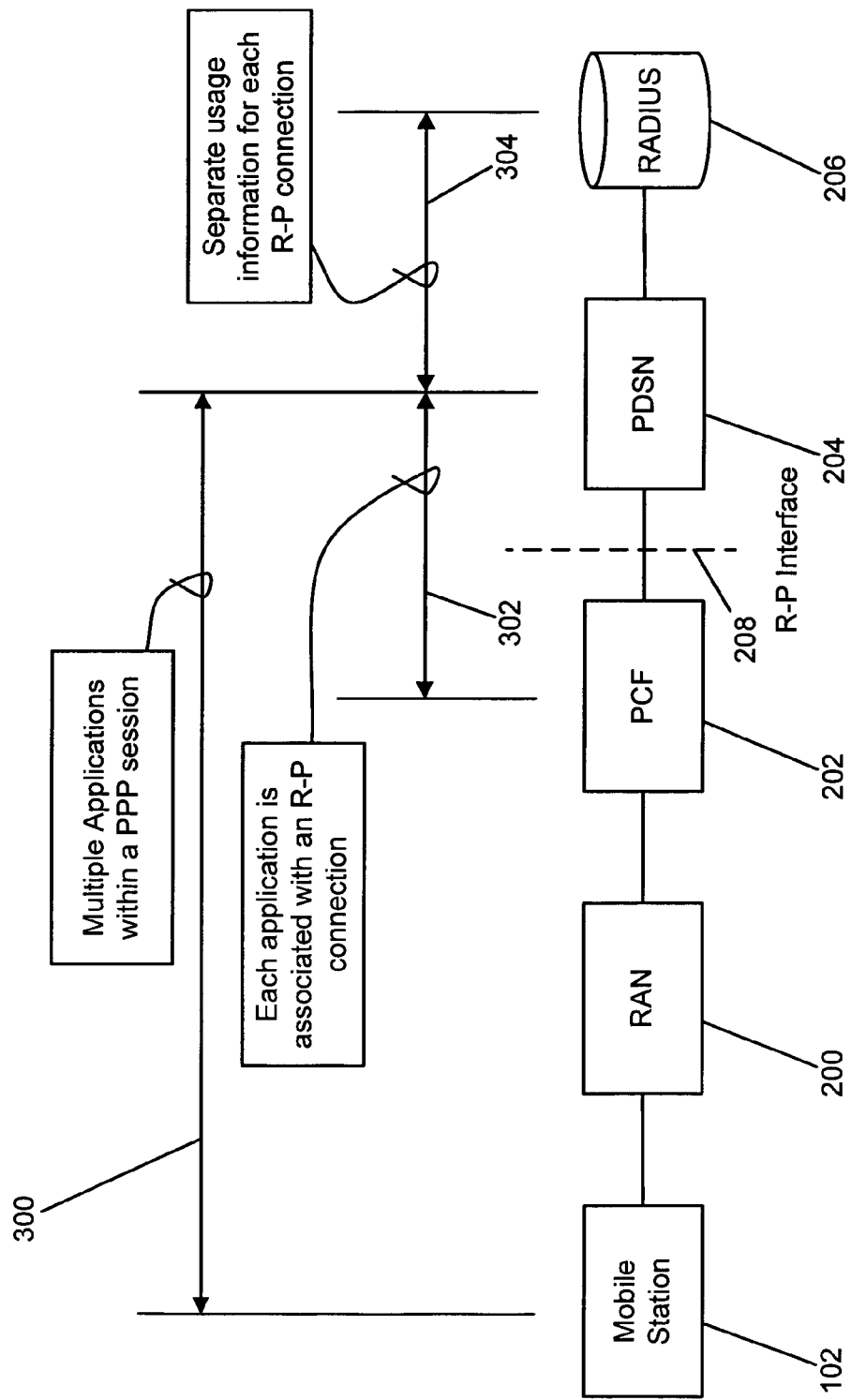
FIG. 3 is a high level graphical summary of a first embodiment.
Figure 4:
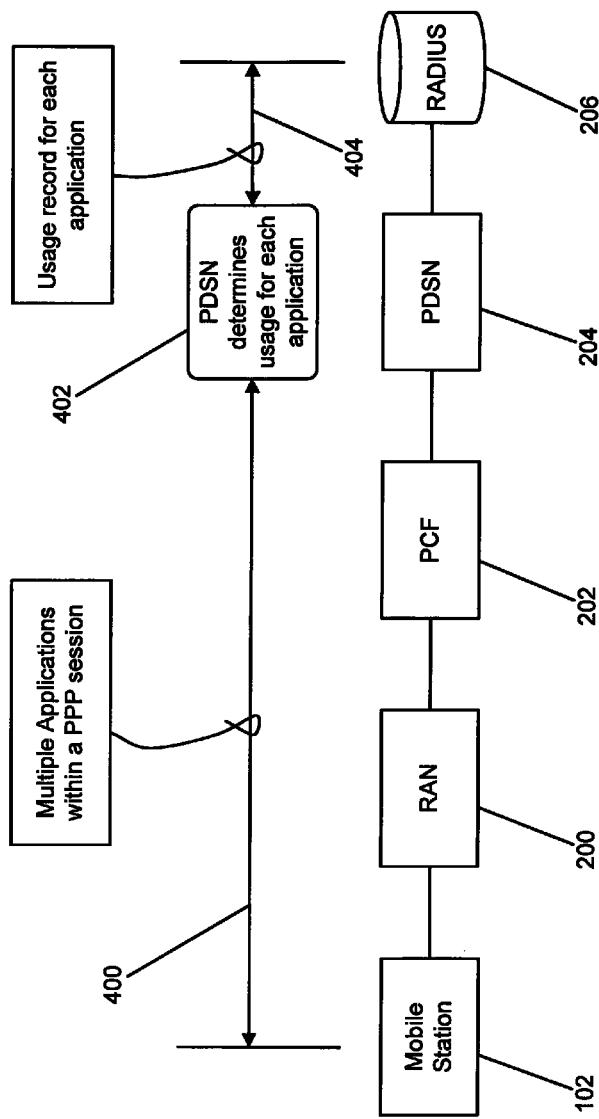
FIG. 4 is a high level graphical summary of a second embodiment.

The present embodiments described herein employ PDSN-based solutions for determining usage information for generating billing for IP-based wireless networks. In particular, according to a first embodiment, multiple R-P connections are associated with a PPP session and usage information is determined for each R-P connection based on a connection type associated with the R-P connection. According to a second embodiment, a PDSN-based process determines usage information based on a determination of the application type associated with an address to which the mobile station 102 connects during a PPP session. FIGS. 3 and 4 graphically summarize at a high level the first and second embodiments, respectively, described above.

First Embodiment

In particular, FIG. 3 (first embodiment) depicts a PPP session 300 encompassing the communication path between mobile station 102 and PDSN 204 and an R-P connection 302 encompassing the communication between PCF 202 and PDSN 204, i.e., across R-P interface 208. With respect to the first embodiment, there may be more than one R-P connection 302 established between PCF 202 and PDSN 204, each of the R-P connections 302 is associated with a PPP session 300. FIG. 3 further includes a representation of a usage information connection 304 between PDSN 204 and a billing system, e.g., RADIUS server 206, for enabling transmission of usage information for each R-P connection 302. As depicted in FIG. 3, multiple applications executed by mobile station 102 use PPP session 300 to access IP network 108 and each executed application is associated with an R-P connection 302.

Figure 7:
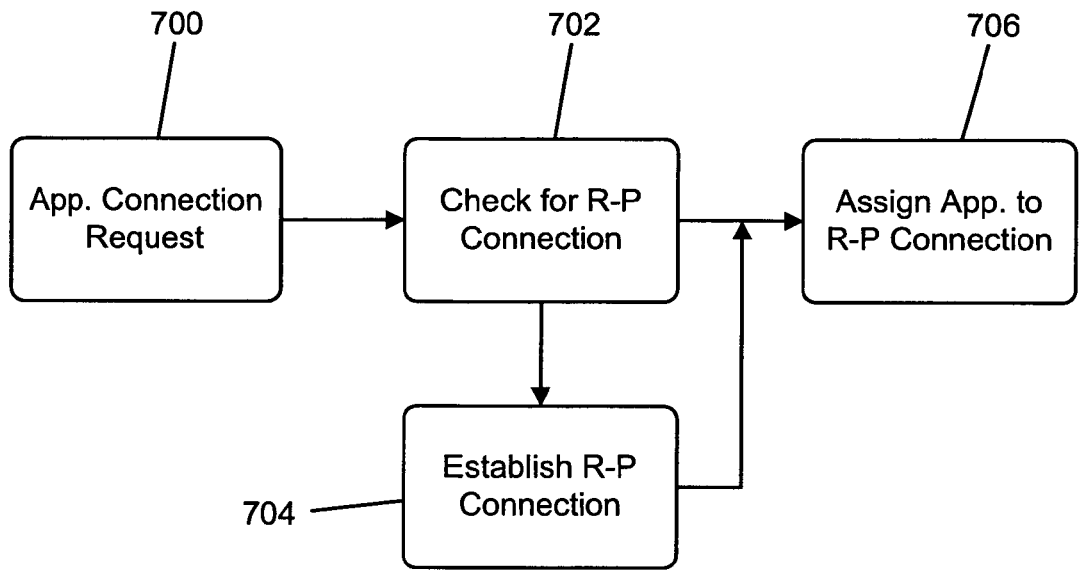
FIG. 7 is a high level process flow of a mobile station in accordance with a first embodiment.
Figure 8:
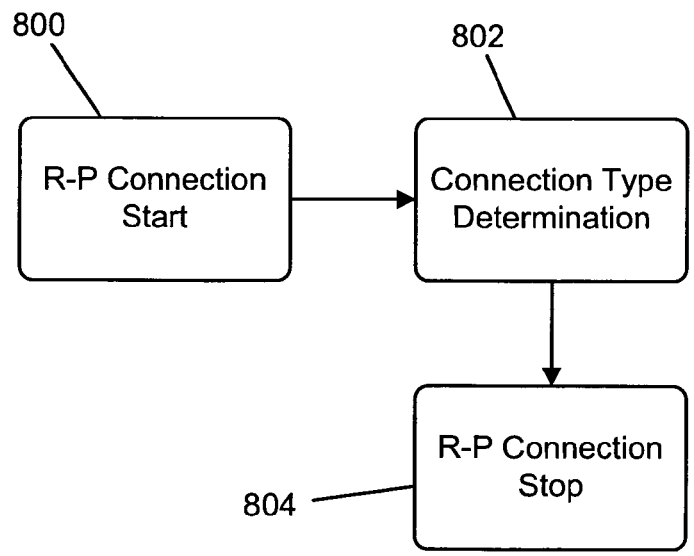
FIG. 8 is a high level process flow of a PDSN in accordance with a first embodiment.

According to the first embodiment described in conjunction with FIGS. 7 and 8, mobile station 102 executes an application requesting access to an address on IP network 108 (FIG. 7, step 700). Responsive to the application request, mobile station 102 determines if an appropriate R-P connection exists (FIG. 7, step 702). If an appropriate R-P connection 302 does not exist, mobile station proceeds to cause an appropriate R-P connection to be established between PCF 202 and PDSN 204. If an appropriate R-P connection exists, mobile station 102 assigns the application to a predetermined R-P connection (FIG. 7, step 706) based on the type of application, e.g., information access, text communication, web browsing, etc. That is, each application communication path from mobile station 102 to IP network 108 uses a particular R-P connection 302. Each R-P connection 302 includes a connection type corresponding to a usage class, e.g., high, medium, and low bandwidth uses, always-on, and intermittent uses, and other classifications.

PDSN 204 detects the start of communication on R-P connection 302 (FIG. 8, step 800) and monitors the application communication, e.g., packet data transmission, over each R-P connection 302. PDSN 204 determines the classification (FIG. 8, step 802), i.e., connection type, of each particular R-P connection 302 used by the application. PDSN 204 detects completion of application communication on R-P connection 302 (FIG. 8, step 804) and records usage information, e.g., duration and amount, for each PPP session 300.

Because a single application is associated with a single R-P connection, the usage information for a particular R-P connection 302 corresponds directly with the application usage information. In this manner, PDSN 204 calculates classified, IP-based network 108 usage information by a mobile station 102 for transmission to a billing system, i.e., RADIUS server 206. It will be understood that many varied connection types and application types may supplement or be substituted for the foregoing recitation of types without departing from the scope of the present embodiments.

In an embodiment, the allocation of application type to R-P connection 302 is predetermined and stored in memory (not shown) of mobile station 102 and PDSN 204. Alternatively, application type allocation to R-P connection 302 may be embedded as part of the instructions executed by mobile station 102. In a further embodiment, mobile station 102 includes an application type identifier in communication, i.e., packet data transmissions, transmitted via PDSN 204 to IP network 108. PDSN 204 detects the included identifier and determines the connection type based on the identifier (FIG. 8, step 802).

Figure 5:
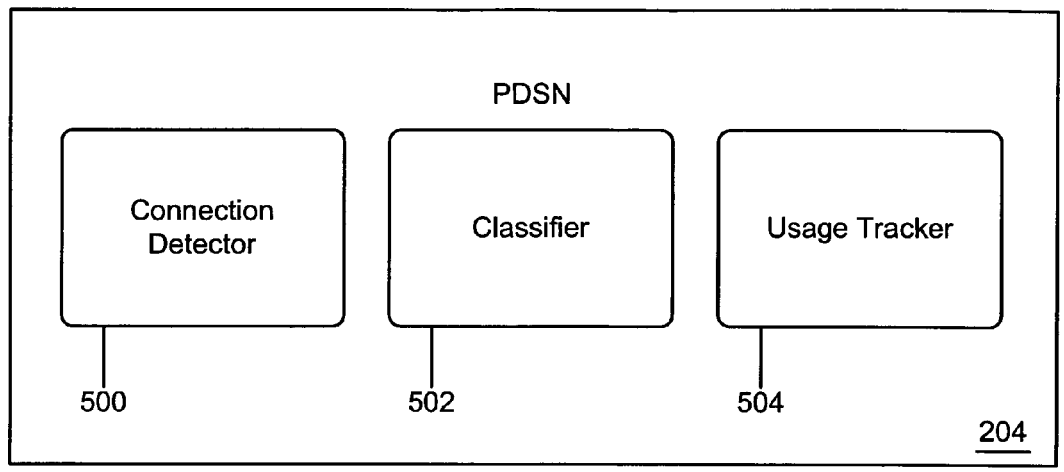
FIG. 5 is a high level block diagram of functionality of the PDSN of FIG. 2.

FIG. 5 depicts a high level block diagram of functional elements of PDSN 204 including a connection detector 500, a classifier 502, and a usage tracker 504. Connection detector 500 includes instructions for execution by a processor (not shown) to cause PDSN 204 to detect establishment of an R-P connection 302 to PDSN 204. Classifier 502 includes instructions for execution to cause PDSN 204 to classify the connection 302 detected by connection detector 500. Usage tracker 504 includes instructions for execution to cause PDSN 204 to capture usage information based on connection type classified by connection classifier 502.

Figure 6:
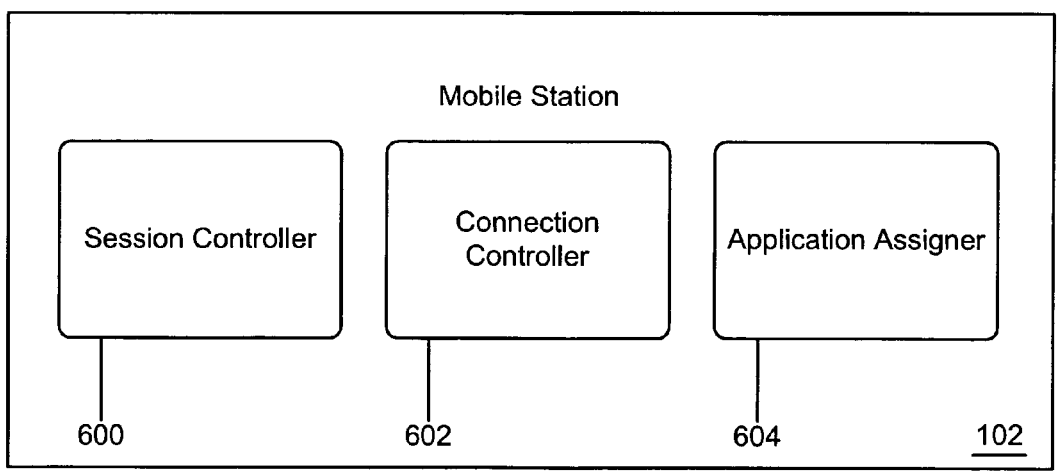
FIG. 6 is a high level block diagram of functionality of the mobile station of FIG. 2.

FIG. 6 depicts a high level block diagram of functional elements of mobile station 102 including a session controller 600, a connection controller 602, and an application assigner 604. Session controller 600 includes instructions for execution to cause mobile station 102 to establish or tear down a PPP session with PDSN 204. Connection controller 602 includes instructions for execution to cause mobile station 102 to determine if an R-P connection 302 exists and, if not, to establish an R-P connection 302 with PDSN 204. Application assigner 604 includes instructions for execution to cause mobile station 102 to assign an application executed by the mobile station to a particular R-P connection 302 associated with a PPP session established by session controller 600.

Second Embodiment

With respect to FIG. 4 (second embodiment), PPP session 400 encompasses the communication path between mobile station 102 and PDSN 204. According to the second embodiment, there may be one or more R-P connections (not shown) between PCF 202 and PDSN 204 without departing from the scope or spirit of the present embodiment. PDSN 204 includes functionality 402, described in detail below, for determining usage information on a per application basis by mobile station 102. FIG. 4 further includes a representation of a usage information connection 404 between PDSN 204 and a billing system, e.g., RADIUS server 206, for enabling transmission of usage information for each application by a mobile station 102. As depicted in FIG. 4, multiple applications executed by mobile station 102 use PPP session 400 to access IP network 108.

Figure 9:
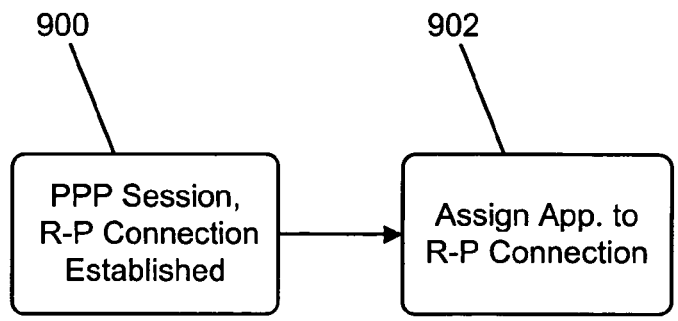
FIG. 9 is a high level process flow of a mobile station in accordance with a second embodiment.
Figure 10:
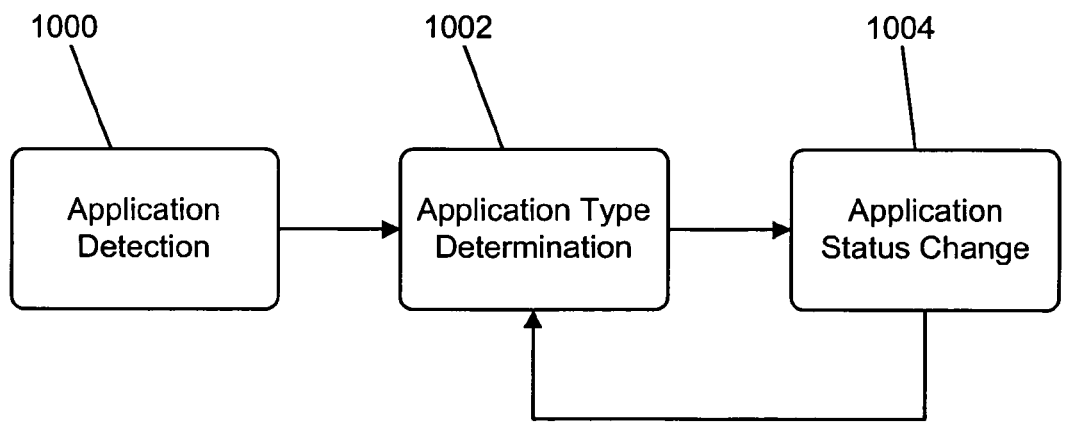
FIG. 10 is a high level process flow of a PDSN in accordance with a second embodiment.

According to the second embodiment described in conjunction with FIGS. 9 and 10, mobile station 102 establishes a PPP session 400, and corresponding R-P connection 402, (FIG. 9, step 900) with PDSN 204. Applications executed by mobile station 102 are assigned by the mobile station to R-P connection 402 associated with PPP session 400 to access a requested address on IP network 108. Because in the second embodiment there is only a single R-P connection 402, subsequent application accesses of different addresses are assigned to the same R-P connection 402 for communication.

PDSN 204 detects the start of application communication on R-P connection 402 (FIG. 10, step 1000) and monitors communication information, e.g., packet data transmission, transmitted by mobile station 102 to determine the address, e.g., IP address, accessed by the application executed by the mobile station in order to capture usage information for a particular application type used by the user of the mobile station. That is, PDSN 204 determines (FIG. 10, step 1002) the application type accessed by mobile station 102 using a method described in further detail below. PDSN 204 detects completion of application communication on R-P connection 402 (FIG. 10, step 1004) and records usage information, e.g., duration and amount, for each application type determined in step 1002. Completion of application communication is determined by PDSN 204 detecting an appropriate termination command from mobile station 102 via R-P connection 402 and/or detecting a change of application type communication on R-P connection 402. For example, PDSN 204 detects a change in packet data information indicating a change in the requested address to be accessed on IP network 108. If the requested address changes, PDSN 204 determines that the application executed by mobile station 102 has changed. PDSN 204 provides usage information on an application type basis to a billing server, e.g., RADIUS server 206.

In another embodiment, if the requested address changes, PDSN 204 performs a look up using one of the below-described application type determining methods to determine if an application type change has occurred. If an application type change has occurred, PDSN 204 begins capturing usage information related to the new application communication. If an application type change has not occurred, PDSN 204 continues capturing usage information related to the application communication.

In an embodiment, PDSN 204 identifies an application type based on the remote addresses, e.g., IPv4/IPv6 addresses, accessed and generates usage information for each application.

The second embodiment uses one or more of three methods for determining the application type accessed by mobile station 102: post-processing, reverse domain name lookup, and application type mapping. Using the post-processing method, after the usage information for each application type is transmitted to the billing system, service provider 104 uses their method of choice to post-process the usage information and separate the application type into appropriate billing categories.

Using the reverse domain name service method, service provider 104 implements a domain name server (DNS)-like functionality. The DNS server is provisioned with an index table including a mapping between the application types and addresses accessed by mobile station 102. However, this method requires a real-time DNS index table update to take into account new addresses accessed by mobile station 102.

Using the application type mapping method, an application type mapping table containing a preset list of addresses and corresponding application types of interest to service providers is included in PDSN 204. PDSN 204 performs a look up into the table to determine the application type and classify the usage information into appropriate categories.

An example procedure for obtaining usage information for a mobile station 102 application according to the second embodiment is as follows:

PDSN 204 detects a different data application based on the remote (accessed) address requested by the application;

PDSN 204 performs a reverse DNS lookup to determine the application type and store usage information for the application;

PDSN 204 routes the data application to the appropriate server;

after the application completes accessing the address, PDSN 204 calculates usage information for the application; and PDSN 204 transmits usage information with the UDR to the billing system.

In accordance with the second embodiment, mobile station 102 and PDSN 204 differ from the above-described functionality of FIGS. 5 and 6. With respect to FIG. 5, connection detector 500 includes instructions for execution by a processor (not shown) to cause PDSN 204 to detect establishment of an R-P connection 302 to PDSN 204. Connection detector 500 further includes instructions for execution to cause detection of an application type change based on classification determination by classifier 502. Classifier 502 includes instructions for execution to cause PDSN 204 to classify the application type of the application assigned to the connection 302 detected by connection detector 500. Classifier 502 uses one of the above-described application type classification methods. Usage tracker 504 includes instructions for execution to cause PDSN 204 to capture usage information based on application type classified by classifier 502.

With respect to FIG. 6, session controller 600 includes instructions for execution to cause mobile station 102 to establish or tear down a PPP session with PDSN 204. Connection controller 602 includes instructions for execution to cause mobile station 102 to instruct PCF 202 to establish an R-P connection 302 with PDSN 204. Application assigner 604 includes instructions for execution to cause mobile station 102 to assign an application executed by the mobile station to the R-P connection 302 associated with a PPP session established by session controller 600.

It will be readily seen by one of ordinary skill in the art that the embodiments fulfills one or more of the advantages set forth above. After reading the foregoing specification, one of ordinary skill will be able to affect various changes, substitutions of equivalents and various other aspects of the embodiments as broadly disclosed herein. It is therefore intended that the protection granted hereon be limited only by the definition contained in the appended claims and equivalents thereof.

What is claimed is:

1. A server for determining usage on a wireless network, comprising:
   a connection detector operative to detect a connection from a mobile station;
   a classifier operatively connected with the connection detector and operative to determine a type of the detected connection,
      wherein the type of the detected connection is determined directly from a plurality of types of connections from the mobile station, or
      wherein the type of the detected connection is determined based on a destination Internet Protocol (IP) address of one or more packets received over the detected connection; and
   a usage tracker operatively connected with the classifier and operative to determine usage for the detected connection based on the type of the detected connection,
   wherein the server corresponds to a Packet Data Serving Node (PDSN).

2. The server of claim 1, wherein the classifier includes one or more designated connection types.

3. The server of claim 2, wherein the connection types include one or more application types.

4. The server of claim 1, wherein the detected connection includes connection type information.

5. The server of claim 1, wherein the usage tracker determines usage based on the classifier detecting a change of connection type.

6. The server of claim 1, wherein the classifier operatively accesses a mapping table to determine the type of the detected connection.

7. The server of claim 6, wherein the mapping table includes information relating address information from the detected connection to the type of the detected connection.

8. The server of claim 1, the usage tracker operative to transmit usage information related to the mobile station, the usage information including duration and amount per connection type.

9. The server of claim 1,
   wherein the detected connection corresponds to one of a plurality of radio network-packet network (R-P) connections between the PDSN and a Packet Control Function (PCF) for the mobile station, and
   wherein each of the plurality of R-P connections for the mobile station is known to be associated with a particular type of connection, such that the classifier compares the detected connection with the plurality of R-P connections to determine the type of the detected connection.

10. The server of claim 1,
    wherein the PDSN receives the one or more packets and the one or more packets are addressed to one of a plurality of destination IP addresses and
    wherein each of the plurality of destination IP addresses is known to be associated with a particular type of connection, such that the classifier compares the destination IP address of the one or more packets with the plurality of destination IP addresses to determine the connection type.

11. A mobile station for accessing a wireless network, comprising:
    a session controller operative to control a session with a server, wherein the server corresponds to a Packet Data Serving Node (PDSN);
    a connection controller operatively connected with the session controller and operative to control a connection related to the session with the server; and
    an application assigner operatively connected with the connection controller and operative to control assignment of an application executed by the mobile station to a particular connection among a plurality of connections with the server, or to assign a particular destination Internet Protocol (IP) address among a plurality of destination IP addresses for one or more packets associated with the application.

12. The mobile station of claim 11, wherein the application assigner includes a mapping of one or more applications to one or more connections and operatively assigns a particular application to a particular connection based on the mapping.

13. The mobile station of claim 11, wherein the application assigner operatively notifies the connection controller of a connection type of an application-connection assignment.

14. The mobile station of claim 13, wherein the connection controller operatively transmits the connection type over the connection of the application-connection assignment.

15. A method of operating a Packet Data Serving Node (PDSN) configured to determine usage on a wireless network, comprising:
    determining, by the PDSN, a connection type responsive to detection of establishment of a connection with a mobile station, wherein the type of the detected connection is determined directly from a plurality of types of connections from the mobile station, or
wherein the type of the detected connection is determined based on a destination Internet Protocol (IP) address of one or more packets received over the detected connection; and
capturing, by the PDSN, usage information for the established connection by connection type.

16. The method of claim 15, further comprising:
generating billing information according to connection type based on the captured usage information.

17. The method of claim 15, wherein the determining is performed based on information received over the established connection.

18. The method of claim 15, wherein the determining is performed based on a mapping table.

19. A method of operating a Packet Data Serving Node (PDSN) configured to determine usage on a wireless network, comprising:
determining, by the PDSN, an application type change based on detection of a destination IP address in a packet differing from a previous destination Internet Protocol (IP) address in a previous packet; and
capturing, by the PDSN, usage information for the changed application type determined by analyzing the detected different destination IP address.

20. The method of claim 19, wherein the analyzing further comprises:
accessing a mapping table to determine the changed application type.

21. The method of claim 20, wherein the mapping table relates the destination IP address from the packet to the changed application type.

22. The method of claim 19, further comprising:
generating billing information according to the changed application type based on the captured usage information.

23. A non-transitory computer-readable medium storing instructions which, when executed by a Packet Data Serving Node (PDSN), cause the PDSN to determine a connection type responsive to detection of a connection with a mobile station, wherein the type of the detected connection is determined directly from a plurality of types of connections from the mobile station, or wherein the type of the detected connection is determined based on a destination Internet Protocol (IP) address of one or more packets received over the detected connection, and further cause the PDSN to capture usage information for the detected connection by connection type.

24. A non-transitory computer-readable medium storing instructions which, when executed by a Packet Data Serving Node (PDSN), cause the PDSN to determine an application type change based on detection of a destination Internet Protocol (IP) address in a packet differing from a previous destination IP address in a previous packet and further cause the PDSN to capture usage information for the changed application type determined by analyzing the detected different destination IP address.

25. A server for determining usage on a wireless network, comprising:
a communication device;
a processor coupled with the communication device; and
a memory coupled with the processor and storing instructions which, when executed by the processor, cause the processor to determine a connection type responsive to detection of a connection with a mobile station, wherein the type of the detected connection is determined directly from a plurality of types of connections from the mobile station, or wherein the type of the detected connection is determined based on a destination Internet Protocol (IP) address of one or more packets received over the detected connection, and capture usage information for the detected connection by connection type, wherein the server corresponds to a Packet Data Serving Node (PDSN).

26. A server for determining usage on a wireless network, comprising:
a communication device;
a processor coupled with the communication device; and
a memory coupled with the processor and storing instructions which, when executed by the processor, cause the processor to determine an application type change based on detection of a destination Internet Protocol (IP) address in a packet differing from a previous destination IP address in a previous packet and capture usage information for the changed application type determined by analyzing the detected different destination IP address, wherein the server corresponds to a Packet Data Serving Node (PDSN).

27. A server for determining usage on a wireless network, comprising:
connection detecting means for detecting a connection from a mobile station;
classifying means connected with the connection detecting means and arranged to determine the type of the detected connection,
wherein the type of the detected connection is determined directly from a plurality of types of connections from the mobile station, or
wherein the type of the detected connection is determined based on a destination Internet Protocol (IP) address of one or more packets received over the detected connection; and
usage tracking means connected with the classifying means and arranged to determine usage for the detected connection based on the type of the detected connection,
wherein the server corresponds to a Packet Data Serving Node (PDSN).

28. A method of operating a mobile station configured to access a wireless network, comprising:
controlling a session with a server, wherein the server corresponds to a Packet Data Serving Node (PDSN);
controlling a connection related to the session with the server; and
assigning an application executed by the mobile station to (i) a particular connection among a plurality of connections with the server, or to (ii) a particular destination Internet Protocol (IP) address among a plurality of destination IP addresses for one or more packets associated with the application.

29. A method of operating a mobile station configured to access a wireless network, comprising:
means for controlling a session with a server, wherein the server corresponds to a Packet Data Serving Node (PDSN);
means for controlling a connection related to the session with the server; and
means for assigning an application executed by the mobile station to (i) a particular connection among a plurality of connections with the server, or to (ii) a particular destination Internet Protocol (IP) address among a plurality of destination IP addresses for one or more packets associated with the application.

30. A non-transitory computer-readable medium storing instructions which, when executed by a mobile station, cause the mobile station to control a session with a server, wherein the server corresponds to a Packet Data Serving Node (PDSN), to control a connection related to the session with the server and to assign an application executed by the mobile station to (i) a particular connection among a plurality of connections with the server, or to (ii) a particular destination Internet Protocol (IP) address among a plurality of destination IP addresses for one or more packets associated with the application.

31. A Packet Data Serving Node (PDSN) configured to determine usage on a wireless network, comprising:
    means for determining, at the PDSN, an application type change based on detection of a destination IP address in a packet differing from a previous destination Internet Protocol (IP) address in a previous packet; and
    means for capturing, at the PDSN, usage information for the changed application type determined by analyzing the detected different destination IP address.

* * * * *